United States Patent Office 2,768,167
Patented Oct. 23, 1956

2,768,167
CYANURIC ACID PREPARATION

William F. Marzluff, Stamford, Conn., and Leslie H. Sutherland, New Orleans, La., assignors to American Cyanamid Company, New York, N. Y., a corporation of Maine No Drawing. Application April 1, 1955,
Serial No. 498,776

4 Claims. (Cl. 260—248)

This invention relates to cyanuric acid and more particularly to a process of making cyanuric acid from amine-substituted triazine ring compounds. Still more particularly, it relates to a method of making cyanuric acid from amine-substituted triazine ring compounds which normally present a disposal problem.

Various methods of making melamine are known or in use. Many have the disadvantage that they often produce as side products such compounds as ammeline, ammelide, and the ammeline:ammelide complex, most of these impurities being admixed with varying amounts of melamine. Since it is quite difficult to separate these reaction product mixtures containing impurities into their several component parts, in the past many proposals have been made in the attempt to minimize the formation of such side products. Nonetheless, they usually form to some extent. Once formed, there remains the problem of how to dispose of them, since it is usually not economically feasible to recover any melamine admixed with such side products.

It is, therefore, the primary object of the present invention to supply a process that will utilize these side products of the melamine reactions along with otherwise wasted melamine mixed therewith in the production of cyanuric acid. It is a further object to present a process for the manufacture of cyanuric acid which utilizes as a starting material amine-substituted triazine ring compounds, such as melamine, ammeline, ammelide, ammeline:ammelide complex, and guanamines.

To this end, the present invention contemplates mixing an amine-substituted triazine ring compound or mixtures thereof with an aqueous solution containing acid in amount at least stoichiometric to any such substituents on said triazine ring compound. This mixture is then heated to a temperature of at least about 165° C. On cooling, it will be found that unusually pure cyanuric acid has been formed in high yield. As high as 90% or more conversions of the feed triazine to cyanuric acid are obtainable. Product cyanuric acid may then be recovered from the reaction medium.

Suitable amine-substituted triazine ring compounds contemplated for treatment by the process of the present invention are such compounds as melamine, ammeline, ammelide, the ammeline:ammelide complex and guanamines.

Any of these compounds or mixtures thereof may be admixed with an aqueous solution of a strong mineral acid. Preferably the acid should be sulfuric acid. Hydrochloric acid also may be used. However, it is not as desirable, since the use of hydrochloric acid causes greater corrosion problems in metallic equipment.

A distinction must be made in a consideration of the quantity of acid supplied and the strength in which it is supplied. The aqueous acidic solution, illustratively an aqueous sulfuric acid solution, must contain a quantity of acid at least stoichiometrically equivalent to the amino substituents on the triazine ring compound. In the case of melamine, the substituents will all be amino groups, and there should be $\frac{3}{2}$ mols of sulfuric acid per mol of melamine. In the case of ammeline, with two amino groups on the ring, there need be but one mol of sulfuric acid per mol of ammeline. In the case of ammelide, with but one amino group on the ring, there need be but $\frac{1}{2}$ mol of sulfuric acid per mol of ammelide. In the same way, there can be calculated the amount of acid needed to treat the ammelide:ammeline complex; it amounts to $\frac{3}{2}$ mols of acid per mol of complex.

The amino substituent apparently is released by hydrolysis and then converted to the corresponding salt, usually ammonium sulfate. If there is not an equivalent amount of acid available, the reaction cannot go to completion. Moreover, if there is not sufficient acid to continue the hydrolysis to completion, the reaction will stop prematurely. For example, ammelide in the presence of less than the equivalent half mol of sulfuric acid will not react completely even at 200° C., in a half hour. Therefore, there must be some excess of acid over the theoretical equivalents. Ammonium sulfate is not sufficiently acid to maintain the reaction.

However, the concentration at which the aqueous acidic solution may be supplied is not critical if the necessary equivalents of acid and some excess are present. If the quantity of acid available is sufficient, the reaction will proceed at the operating temperature. However, it has now been found that the rate of reaction is dependent on the available free acid concentration. At below an available free acid concentration of about five percent, not only the yield but the rate is too poor for general use, even at the optimum temperature. For example, at about 180° C., the reaction will take place with increasing speed up to a free acid concentration of about 20% or more sulfuric acid. More acid can be used if so desired. However, at this concentration value, further addition of acid is not necessary, since the rate attained using 20% is quite adequate.

It must be noted, however, that this is not merely a question of supplying an excess quantity of acid. Even though a 10% aqueous sulfuric acid solution is used in amount such that there is a large excess of available acid, the reaction rate will be substantially slower than if the same amount of 20% sulfuric acid solution is used. In fact, a much smaller volume of acid solution may be used to produce the same reaction rate if the acid concentration is 20% or more.

For the above reasons, then, it is preferred to carry out the reaction in an aqueous acidic medium, initially comprising at least a 10%, and preferably a 20%, sulfuric acid solution, even though about 5–20% concentrations can be used. Lower concentrations produce too slow reaction rates, while higher concentrations are not needed to increase the reaction rate beyond that obtainable with about a 20% sulfuric acid solution.

As noted above, a slight excess quantity of available acid is necessary to drive the reaction. Even a small excess is helpful. It is preferred to maintain about a five percent excess acid over that stoichiometrically equivalent to the amine substituent on the triazine ring. Again, more acid may be supplied, but above about five percent, such an excess will serve no economically useful purpose. The five percent excess quantity should not be confused with the 5% free acid which should be used to maintain the minimum acceptable reaction rate, even though they are numerically the same.

The mixture of triazine and aqueous acid solution must then be heated to a temperature of at least about 150° C. It can be seen that the heating step must be carried out under pressure, otherwise water will be lost. The pressure, however, is not critical and the autogenous pressures developed at the various reaction temperatures are normally used.

At temperatures below about 165° C., the reaction rate is so slow as to be negligible. Above about this temperature the reaction rate increases rapidly, becoming commercially attractive at around 175°–180° C. and reaching about the optimum rate at about 200° C. Higher temperatures may be used but the additional advantages thereby gained are usually offset by the increased expense.

The period of time necessary for the reaction medium to be maintained at the desired temperature is not critical. Once the reaction mass has reached that temperature, cyanuric acid will be formed. However, if the yield is to be maintained at a higher level, then the reaction mass should be maintained at the reaction temperature for a period of from about an hour at the lower temperatures to about 2–3 minutes at the optimum. Larger batches may be maintained at the selected temperature for longer periods of time.

Once the reaction medium has been maintained at the desired temperature for the proper period of time, the reaction goes substantially to completion. The reaction medium may then be cooled, at which time large crystals of very pure cyanuric acid will crystallize from solution and may be recovered therefrom by any desirable means, as by filtration and the like.

The following examples serve to illustrate without limiting the invention. All parts are by weight unless otherwise stated.

*Example 1*

Into a Carius tube is placed 1 part melamine (0.0128 mol) and 31 parts by volume 16% $H_2SO_4$ (0.0507 mol). The tube was sealed and heated at 200° C. for 1 hour. On cooling to room temperature, 1 part of long silky needles crystallized from solution. These needles, on analysis, are found to consist of pure cyanuric acid for a yield equivalent to 98.1% based on the melamine at the start.

*Example 2*

1 part ammelide and 1 part ammeline are separately treated as is the melamine in Example 1. These samples are all heated to 200° C. in an oven. In each case, pure cyanuric acid is recovered. The ammeline gives a yield equivalent to 100.5%, while the ammelide gives a yield equivalent to 92.6%.

*Example 3*

A series of samples of a mixture comprising 95% ammelide and 5% ammeline are treated at 200° C. as outlined in Example 1. The conditions of the runs and the results of the runs are listed in the following table:

| Percent $H_2SO_4$ (concentration) | Ratio (in mols) of $H_2SO_4$ to available amine-substituent | Time (minutes) | Conversion (percent) |
|---|---|---|---|
| 5 | 4.0 | 48 | 78.8 |
| 10 | 2.0 | 47 | 91.2 |
| 20 | 0.52 | 10 | 98.5 |
| 20 | 0.52 | 20 | 100.0 |
| 20 | 2.0 | 15 | 96.8 |
| 20 | 2.0 | 30 | 98.8 |
| 20 | 2.0 | 35 | 100.7 |
| 50 | 8.0 | 10 | 92.9 |

We claim:
1. In making cyanuric acid by admixing a material selected from the group consisting of melamine, ammeline, ammelide and the ammeline:ammelide complex, and mixtures thereof with an aqueous solution containing sulfuric acid in amount at least stoichiometric to the amine substituent on said compounds and heating said mixture: the method of improving the reaction rate and yield which comprises the combination therewith of maintaining a stoichiometric excess of up to about five percent of free acid supplied as an aqueous solution thereof having a concentration of at least 5% free acid and maintaining the mixture at a temperature of at least 175° C. under at least the autogenously developed pressure until reaction substantially ceases.

2. The method according to claim 1, wherein said acid is sulfuric acid supplied at a concentration of from about 10 to about 20 percent.

3. The method according to claim 1, wherein said temperature is from about 180° to about 200° C.

4. The method of making cyanuric acid which comprises mixing a compound selected from the group consisting of melamine, ammeline, ammelide, ammeline:ammelide complex and mixtures thereof with an aqueous sulfuric acid solution containing about 20% sulfuric acid in amount sufficient to furnish said acid in excess up to about 5% of that stoichiometric to the amine substituents on said compounds, heating said mixture to a temperature of about 180° C. to about 200° C., cooling said mixture, and recovering cyanuric acid from said cooled mixture.

References Cited in the file of this patent

"Chem. of Melamine," American Cyanamid, p. 19, March 1954.